United States Patent [19]

Ushiyama

[11] 4,281,901
[45] Aug. 4, 1981

[54] ELECTRODE STRUCTURE IN DISPLAY DEVICE

[75] Inventor: Yoshito Ushiyama, Suwa, Japan

[73] Assignee: Kabushiki Kaisha Suwa Seikosha, Tokyo, Japan

[21] Appl. No.: 904,651

[22] Filed: May 10, 1978

[30] Foreign Application Priority Data

May 11, 1977 [JP] Japan .................. 52-54116

[51] Int. Cl.³ ............................................. G02F 1/133
[52] U.S. Cl. ...................................... 350/336; 350/334
[58] Field of Search ............... 350/334, 336; 340/765

[56] References Cited

U.S. PATENT DOCUMENTS

| | | | |
|---|---|---|---|
| 3,781,863 | 12/1973 | Fujita | 350/336 X |
| 4,110,744 | 8/1978 | Laesser | 350/336 X |

*Primary Examiner*—Edward S. Bauer
*Attorney, Agent, or Firm*—Blum, Kaplan, Friedman, Silberman & Beran

[57] ABSTRACT

In a display device in which characters are made visible by imposition of an electromagnetic field across selected portions of said device and in which the characters are arranged in a plurality of rows or columns, the space required within the display area of said device for leads connecting the segments of each character to an external source of voltage is substantially reduced. Reduction of the area allocated to connections makes it possible to increase the fraction of the total area available for actual display of characters and thus to increase the size and readability of the characters. The arrangement taught herein is suitable for any number of rows or columns of characters so long as said number is at least two.

8 Claims, 6 Drawing Figures

FIG. 1a
FIG. 1b
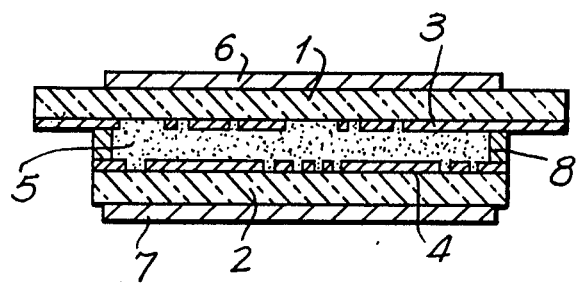
FIG. 2
FIG. 3a
PRIOR ART
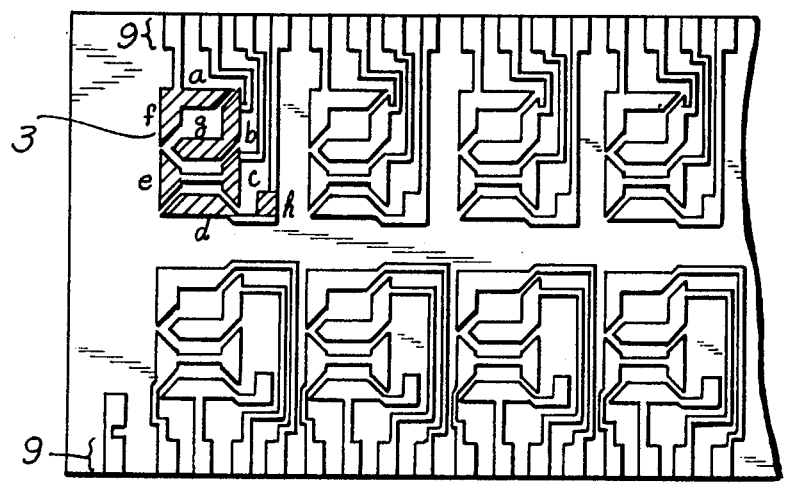

ELECTRODE STRUCTURE IN DISPLAY DEVICE

BACKGROUND OF THE INVENTION

The present invention is directed to character displays in which the characters are formed of segments each of which can be selectively activated by connection to an external source of voltage. More particularly, the present invention is concerned with such character displays in which the character is formed of the segments described on one of a pair of plates, the other of the pair of plates having on the surface thereof pairs of common electrodes, each pair of common electrodes being opposed to a character on said one plate. The desired display pattern is displayed through the use of a dielectric material such as liquid crystal between the plates, PLZT, or electrochromic material between the plates. It is only necessary that the dielectric material change in appearance in response to the imposition of an electric field.

In the usual seven-segment assembly for displaying numerals, the seven segments are on one plate and a common electrode is disposed on the other plate forming a cell with said one plate. This arrangement requires a total of eight leads for displaying a single digit. Where a plurality of rows of digits or other characters is to be displayed, the number of leads becomes inconveniently great from two standpoints. The first of these is that a large fraction of the display area must be devoted to leads from the edge of the plate to the separate segments and to the common electrode. In addition, mass production becomes difficult since the leads must be disposed with great accuracy in order to avoid either open circuits or short circuits.

With the objective of decreasing the number of leads necessary for displaying a single digit, arrangements of the segment have been developed in which the segments on the one plate are grouped. The facing electrode on the other plate is then divided into two common electrodes rather than the usual one common electrode. A multiplexing technique makes it possible to display any of the numerals from 0 to 9 through the use of only four leads on the one plate and two leads on the other, such an arrangement therefore operating with only six leads per digit.

While the number of leads necessary for display of a digit or other characters is reduced through the use of two common electrodes rather than one, nevertheless, trunk lines with branch lines leading to each of the common electrodes must be provided. Moreover, the arrangement of the trunk lines must be such that no part of a trunk line opposes a lead line on the facing plate since, if there is such opposition, the region of the plate where the opposition occurs will become visible, and confusion will result. Consequently, an arrangement in which the space required for trunk lines is decreased and which avoids the possibility of an undesired opposition between trunk lines on one plate and lead lines on the facing plate where the characters are arranged in at least two rows or columns is to be desired.

SUMMARY OF THE INVENTION

In a display device providing for the display of a plurality of characters in a plurality of rows or columns, said display being rendered visible by imposition of an electric field across a dielectric material, said display device including a substrate on which are provided a first and a second common electrode fro each character to be displayed, the number of trunk lines which must be provided for making connection to all of said first and second common electrodes is reduced by placing said trunk lines to said first and second common electrodes between alternate rows of characters. More specifically, where there are two rows of characters, a single trunk line may be placed between said rows of characters for making connection with all of said first common electrodes and two additional trunk lines are then positioned externally to said rows of characters for making contact to said second common electrodes.

This arrangement of trunk lines eliminates the necessity for a space between two different trunk lines between any adjacent pair of rows or columns of characters, and therefore, provides additional space for display of characters, the additional space corresponding to a single insulating space between two trunk lines and a trunk line itself.

The arrangement of trunk lines for connecting common electrodes of one type in a plurality of rows is applicable to any display device in which common electrodes must be connected to an external source of voltage for display purposes. Examples of such display devices are those which function on the basis of liquid crystal compounds, PLZT's and electrochromic cells.

Accordingly, an object of the present invention is a display device of small size in which the area available for the display of characters is increased.

Another object of the present invention is a display device is which the area which must be allocated for electrical connections to display elements is reduced.

A further object of the present invention is a display device offering a greater area for display of actual characters where the display device is more readily and easily manufactured by mass production techniques.

An important object of the present invention is a display device in which greater legibility is achieved through a more suitable arrangement of the leads connecting each display segment and electrode to an external source of voltage.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1a shows schematically the panel of a display device for showing numbers in two rows;

FIG. 1b shows a similar display device for showing both letters and numbers in three rows;

FIG. 2 is a sectional view of a display device based on the use of a liquid crystal composition of an electrochromic solution;

FIG. 3a shows schematically a display panel with segmented electrodes thereon in a conventional arrangement;

DESCRIPTION OF THE PREFERRED EMBODIMENTS

Figure 3B:
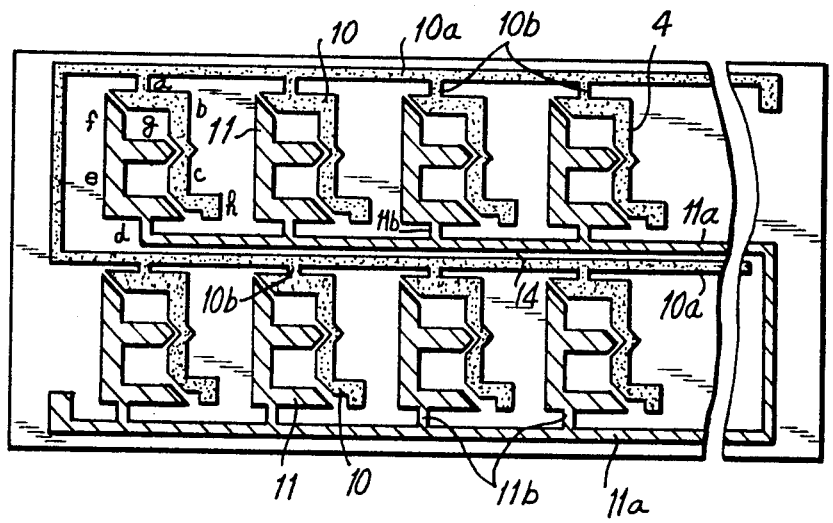
FIG. 3b shows the facing panel to that of FIG. 3a, each of the characters on the panel of FIG. 3a having opposed thereto on the panel of FIG. 3b a pair of common electrodes for displaying any numeral at any position in the two rows shown the arrangement of the trunk lines thereon being conventional.

As aforenoted, the present invention relates to a display device in which a display pattern of numerals, marks, letters, is dynamically produced, said characters being disposed in at least two rows or columns, the term "rows" hereinafter being taken to mean either rows or columns or, indeed, lines of characters in any orientation. Characters, in the form of both numbers and letters are shown in FIGS. 1a and 1b. FIG. 2 is a sectional view showing the general construction of a display device, whether conventional or in accordance with the present invention. In the device shown in FIG. 2, a liquid crystal or an electrochromic solution is used as the dielectric material, the constitution of such liquid crystal compositions and electrochromic solutions being generally known. Upper panel 1 and lower panel 2 are generally of transparent glass, and these transparent substrates sandwich a liquid crystal or electrochromic solution 5 forming, together with sealing material 8 a cell of fixed volume. Segment electrodes 3 and common electrodes 4 are formed, respectively, on the inner surfaces of substrates 1 and 2. Upper and lower polarizing plates 6 and 7 may be provided where material 5 is a liquid crystal composition operable in the field-effect mode.

Turning now to FIG. 3a, an arrangement of segments is shown in which the segments are combined for simultaneous activation. Thus, segments a and f are connected by means of a single lead to a single pad for connection to an external voltage source. Similarly, segments b and g are connected together and segments c and e are connected together. Segment d is not connected to any other segment for display of a digit, but, instead, may be connected to an external region h for display of a decimal point, a colon or the like. It will be noted that only 4 leads and 4 electrode pads are needed per numeral on this plate. The number of electrode pads 9 is therefore 4 times the number of numerals to be displayed.

The conventional substrate or plate forming the other face of the display device is shown in FIG. 3b in which the segments are combined into a first common electrode and a second common electrode. The first common electrode connects segments a, b, c with the external region h. The second common electrode consists of segments f, e g and d. All of the first common electrodes are connected with trunk line 10a through branch lines 10b. Similarly, all of the second common electrodes 11 are fed by trunk lines 11a through branch lines 11b. As will be noted, in the arrangement of trunk lines shown in FIG. 3b, there are two horizontal trunk lines 10a and two horizontal trunk lines 11a. In addition, a space 14 must be provided between the two rows of common electrodes. The total number of horizontal portions of trunk lines in the conventional construction is therefore four.

Figure 4:
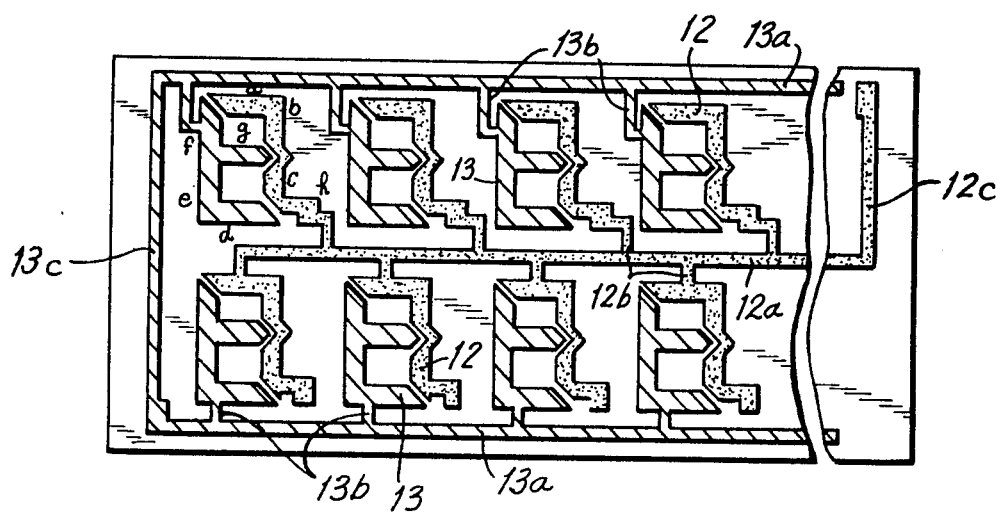
FIG. 4 shows a facing substrate in accordance with the present invention, the panel being provided with a pair of common electrodes for the display of each numeral in any of the positions in the two rows.

Now considering the substrate of FIG. 4 holding pairs of common electrodes, only trunk line 12a lies between the two rows of numerals, trunk line 13a having horizontal portions only outside the two rows and not between same, said horizontal portions being connected by vertical portions 13C. Accordingly, the number of horizontal trunk line portions is reduced from four to three. Moreover, the space which must be allotted for insulation and separation of two adjacent trunk lines as indicated by the reference numeral 14 in FIG. 3b now becomes available for actual display. Accordingly, for a given size of a display panel, a greater fraction of said display panel can be allocated to actual display than is the case where a portion of the display must be reserved for a second trunk line between each row of characters as well as for an insulating space between pairs of trunk lines between said rows. As is clear, branch lines 12b leading from trunk line 12a must be laid out appropriately as is shown in FIG. 4 and the same is true for branch lines 13b connecting second common electrodes with trunk line 13a. Moreover, the electrode pairs in each character are similar, both as to shape and as to disposition in each character, so that each character group contains an electrode of a first shape and disposition and a second electrode of a second shape and disposition, all of said first shapes and dispositions being the same and all of said second shapes and dispositions being the same. Also, one of said trunk lines is connected by said branch lines to said electrodes of said first shape and disposition and the other of said trunk lines is connected by said branch lines to said electrodes of said second shape and disposition. However, the area which must be reserved for such branch lines is no greater than is the case for the conventional construction and no further difficulties are encountered or introduced with respect to avoidance of crossing of leads on the facing substrates. Moreover, the arrangement shown in FIG. 4 can easily be extended to displays in which the number of rows is greater than two, the general principle being that horizontal trunk line portions for each set of common electrodes are positioned alternately in the spaces between successive rows of characters and connected by vertical portions such as portion 13C at one or the other end of the rows. This arrangement provides a more effective use of the display area, making it possible to decrease the size of the display area for a given size of character, such a reduction in overall size being particularly valuable for small-sized machinery and tools such as wristwatches and electronic calculators. Also, since a space need not be provided for insulating adjacent trunk lines from each other, the precision with which such a facing panel must be manufactured is reduced, thereby facilitating mass production and reducing the cost of manufacture.

As will be evident from FIG. 4, only one connecting portion between alternating portions of a trunk line need be disposed at one end of the rows of characters. If there were a third row of characters, portion 12c of the trunk line 12a could be continued downward at the right hand end of the rows, as viewed in FIG. 4, to another horizontal portion of trunk line 12a, said another portion of turnk line 12a being exterior to said postulated third row. Again, there would be only one trunk line connecting portion at the right hand end of the rows, eliminating the need for spacking between a plurality of vertical connecting portions.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An improvement in an electrode structure in a display device for operation in a multiplexing mode, said device including at least two panel substrates, a display material therebetween, electrode segments disposed in a plurality of first groups on one of said substrates said segments in each of said first groups being arranged in individually-activatable first subgroups, said first groups being disposed for displaying a plurality of characters in each of a plurality of spaced-apart rows, the term "rows" including but not being restricted to rows and columns, the arrangement of segments into sub-groups being the same for all of said groups;

electrode segments in a plurality of second groups on the other of said substrates, each of said second groups being disposed opposite one of said first groups for cooperating therewith in producing display of a character, said segments in each of said second groups being arranged in individually-activatable first and second common electrodes, the arrangement of said segments into said first and second common electrodes being the same for all of said second groups; first trunk lines connecting together all of said first common electrodes, and second trunk lines connecting together all of said second common electrodes, said improvement comprising the disposition of said first and second trunk lines alternately between and at the outer sides of said plurality of rows so that only one trunk line is disposed between any pair of rows, thereby eliminating the need for an insulating space between adjacent trunk lines and increasing the fraction of the display area of said display device available for displaying said characters.

2. An improvement in an electrode structure in a display device as claimed in claim 1, further comprising first and second sets of branch lines connecting each of said first and second trunk lines to each of said first and said second common electrodes in each of said groups in each of said rows.

3. An improvement in an electrode structure in a display device as claimed in claim 1, wherein said display device is a liquid crystal device.

4. An improvement in an electrode structure in a display device as claimed in claim 1, wherein said display device is an electrochromic device.

5. An improvement in an electrode structure in a display device as claimed in claim 1, wherein said display device has two edges parallel to said rows, each of said edges being nearer one of said rows, contact pads along said two edges on said one substrate and has leads electrically connecting all of the electrode segments in the groups in each of said rows on said one substrate with said contact pads on the nearer of said edges, the region between said rows on said one substrate being free of leads, whereby the crossing of a trunk line on said second substrate with any of said leads on said one substrate in said region between said rows is avoided.

6. An improvement in an electrode structure in a display device as claimed in claim 1, wherein the number of rows is two, said first trunk line and only said first trunk line is disposed between said rows and said second trunk line and only said second trunk line is disposed adjacent to and exterior to said rows.

7. An improvement in an electrode structure in a display device as claimed in claim 3, wherein said display device includes polarizing plates sandwiching said panel substrates and liquid crystal material for operation in the field-effect mode.

8. An improvement in an electrode structure in a display device as claimed in claim 1, wherein said structure includes a first row and a second row, said first trunk line and only said first trunk line is disposed between said first and second rows, and said second trunk line comprises a first portion adjacent and exterior to said first row, a second portion adjacent and exterior to said second row, and a third portion joining said first and second portions at one end of said rows, only said third portion of said second trunk line being disposed at said one end of said rows.

* * * * *